US011355962B2

(12) United States Patent
Spinella et al.

(10) Patent No.: US 11,355,962 B2
(45) Date of Patent: Jun. 7, 2022

(54) APPARATUS FOR TRANSFERRING ELECTRICAL POWER TO AN ELECTRICAL LOAD WITH CONVERTER

(71) Applicant: EGGTRONIC ENGINEERING S.P.A., Modena (IT)

(72) Inventors: Igor Spinella, Modena (IT); Enrico Dente, Avigliana (IT); Giovanni Mascia, Rubiera (IT)

(73) Assignee: EGGTRONIC ENGINEERING S.P.A., Modena (IT)

( * ) Notice: Subject to any disclaimer, the term of this patent is extended or adjusted under 35 U.S.C. 154(b) by 0 days.

(21) Appl. No.: 17/279,395

(22) PCT Filed: Sep. 2, 2019

(86) PCT No.: PCT/IB2019/057386
§ 371 (c)(1),
(2) Date: Mar. 24, 2021

(87) PCT Pub. No.: WO2020/065423
PCT Pub. Date: Apr. 2, 2020

(65) Prior Publication Data
US 2021/0391748 A1    Dec. 16, 2021

(30) Foreign Application Priority Data

Sep. 26, 2018 (IT) .......................... 102018000008922

(51) Int. Cl.
*H02J 50/05* (2016.01)
*H02M 3/158* (2006.01)
(52) U.S. Cl.
CPC ........... *H02J 50/05* (2016.02); *H02M 3/1582* (2013.01)
(58) Field of Classification Search
None
See application file for complete search history.

(56) References Cited

U.S. PATENT DOCUMENTS 4,412,277 A    10/1983  Mitchell et al.
7,345,893 B2 *  3/2008  Boldo ................... H02M 3/155
                                                         323/222

(Continued)

FOREIGN PATENT DOCUMENTS

WO    2013150352 A1    10/2013
WO    2018115991 A1     6/2018

OTHER PUBLICATIONS

Ge Xuejian et al "Loss analysis and efficiency optimization of buck converter in wireless charging system for EVs", 2017 IEEE Pels Workshop On Emerging Technologies: Wireless Power Transfer (WOW), IEEE, May 20, 2017, pp. 329-331.

(Continued)

Primary Examiner — Jeffery S Zweizig
(74) Attorney, Agent, or Firm — Browdy and Neimark, PLLC

(57) ABSTRACT

The invention describes an apparatus (100) for transferring electrical power to an electrical load (110), comprising: a primary circuit (115), an electrical source (105) adapted for supplying said primary circuit with a direct input voltage, a secondary circuit (120) adapted for feeding the electrical load (110), and a coupling device (125) adapted for transferring electrical power from the primary circuit (115) to the secondary circuit (120), wherein the primary circuit (115) comprises: a converter (300) adapted for receiving the input voltage, for modifying said input voltage and for outputting said modified voltage, and a wave generator (190) comprising at least one switching circuit provided with at least one active switch (250), which is adapted for receiving in input the modified voltage in output from the converter (300), for converting said modified voltage into voltage waves and for applying said voltage waves to said coupling device (125), and wherein said converter comprises at least one active switch (315) adapted for selectively allowing or preventing (Continued)

the passage of electrical current from the electrical source (105) to the wave generator (190).

14 Claims, 8 Drawing Sheets

(56) References Cited

U.S. PATENT DOCUMENTS

| | | |
|---|---|---|
| 9,093,215 B2 | 7/2015 | Low et al. |
| 2007/0279955 A1 | 12/2007 | Liu et al. |
| 2010/0259240 A1 | 10/2010 | Cuk |

OTHER PUBLICATIONS

Rozario Deepak et al: "A modified resonant converter for wireless capacitive power transfer systems used in battery charging applications", 2016 IEEE Transportation Electrification Conference and Expo (ITEC), IEEE, Jun. 27, 2016 (Jun. 27, 2016), pp. 1-6.

\* cited by examiner

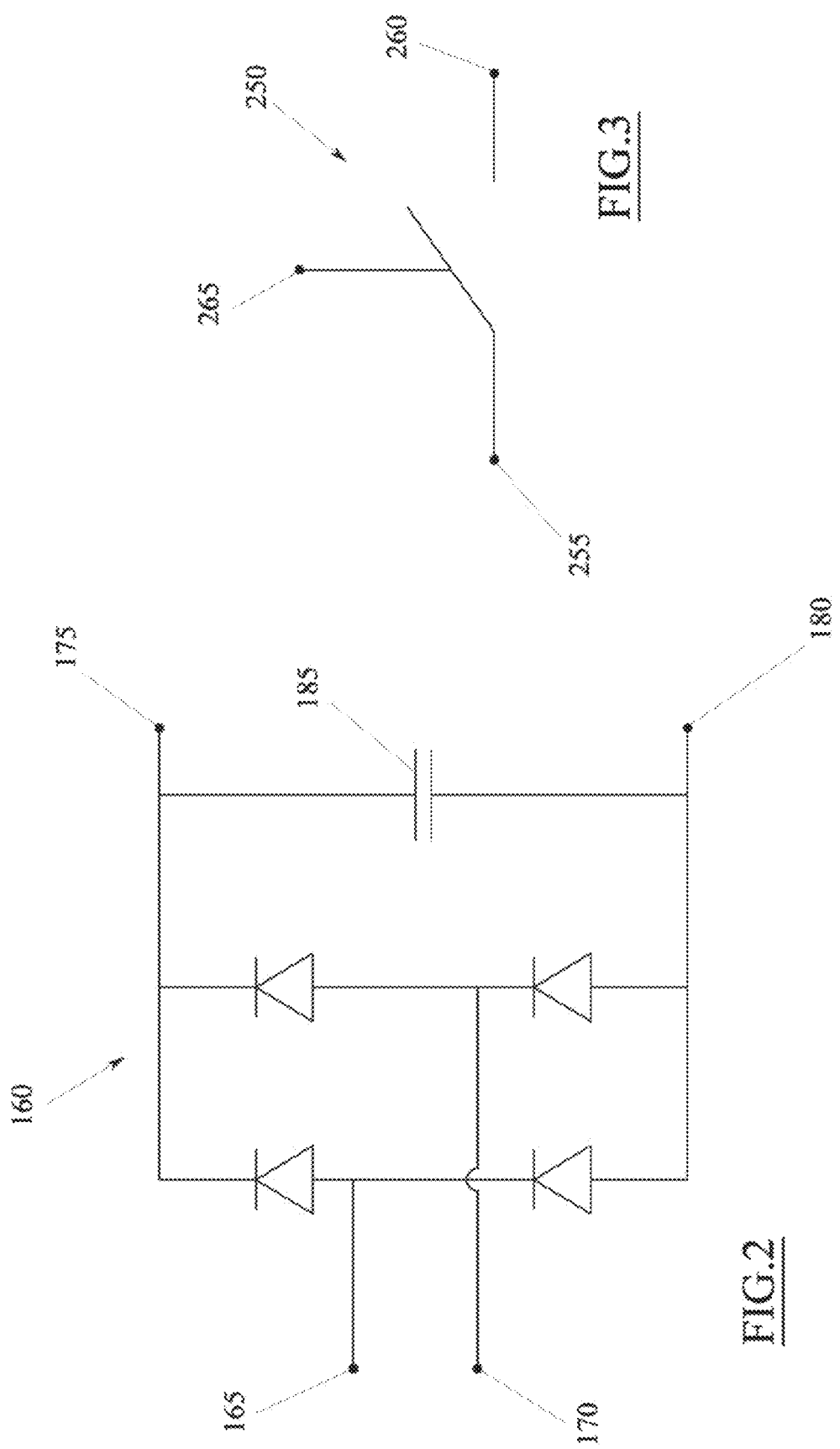

APPARATUS FOR TRANSFERRING ELECTRICAL POWER TO AN ELECTRICAL LOAD WITH CONVERTER

TECHNICAL FIELD

The present invention concerns an apparatus for transferring electrical power to an electrical load. The electrical load can for example be any electrical or electronic device that must be fed electrically to allow the operation thereof and/or to charge the inner batteries of the device itself. Classic examples of this type of electrical/electronic devices include, but are not limited to, smartphones, computers, laptops, tablets, television sets, domestic appliances, automated systems, servers and many other similar devices.

PRIOR ART

A solution currently very widely used for transferring electrical power to an electrical load is that of using an AC/DC converter, which is capable of converting an alternating voltage (AC), generated for example by a common electrical distribution network (e.g. 50-60 Hz, 90-250V AC), into a direct voltage (DC) suitable for feeding the electrical load.

AC/DC converters generally comprise a primary circuit, typically connected to the alternating voltage source, and a secondary circuit, typically connected to the electrical load.

The primary circuit usually comprises a high-voltage rectifier, normally a diode bridge rectifier, which can be connected to the electrical distribution network, normally through an electric plug, so as to convert the alternating voltage supplied by the electrical network into a substantially direct voltage.

The high direct voltage in output from the rectifier is used to feed a wave generator, which is typically made in the form of a switching circuit, for example based on H bridges, half bridges or resonant architectures, capable of generating high frequency (HF) electrical voltage waves.

Such voltage waves are thus sent to a suitable coupling device that allows the transmission of electrical power between the high-voltage primary circuit (rectifier and wave generator) and the secondary circuit.

In some embodiments, this coupling device can be configured to also make a galvanic insulation between the primary circuit and the secondary circuit that ensures safety of use and strength.

In particular, the galvanic insulation is necessary to prevent damage or overvoltages in the primary circuit from being able to make the secondary circuit dangerous, which is at low voltage and is normally arranged close to the user (consider the exposed contacts of connectors for powering a smartphone or a portable computer).

The secondary circuit can comprise a second rectifier, electrically arranged between the coupling device and the electrical load, which is adapted for converting the voltage wave coming from the primary circuit into a substantially direct voltage to be applied to the electrical load.

The most common AC/DC converter is the so-called flyback converter, in which the coupling device that ensures the galvanic insulation between the primary circuit and the secondary circuit comprises a transformer, typically a transformer operating at frequencies of the order of tens of kHz, hundreds of kHz or a few MHz.

A different category of AC/DC converters, on the other hand, provides for the coupling device to comprise one or more insulation capacities, typically of small value (for example tens of pF, hundreds of pF or nF), which ensure the passage of electrical energy between primary circuit and secondary circuit through capacitive coupling. The advantages of AC/DC converters coupled in a capacitive manner are many, but they mainly consists of the possibility of greatly reducing the space occupied, thanks to the elimination of the transformer and to the possibility of increasing the operating frequencies (for example reaching hundreds of kHz, MHz, tens of MHz or hundreds of MHz).

A further advantage of these AC/DC converters coupled in a capacitive manner is the fact that it is possible to reach a higher operating efficiency with respect to solutions based on transformers, which typically remains stable both for light electrical loads and for heavy electrical loads, rather than a tendentially low efficiency with peaks only for certain load ranges, as typically occurs in converters insulated through transformer.

However, all AC/DC converters can have the drawback that the active switches (e.g. MOSFET) present in the wave generator, especially when the latter is made in the form of a resonant circuit, can be subjected to extremely high voltages.

In particular, the maximum voltage applied to these active switches can be nominally equal to the input voltage supplied by the rectifier, increased according to a multiplication factor that can be from 2 to 10 times the input voltage, and which is typically around 5 times the input voltage.

In the case in which the rectifier is adapted for rectifying the mains voltage, this means that the active switches of the wave generator must be able to withstand voltages of thousands of Volts.

For example, considering a mains voltage having effective value of 240V—typical of some countries in the world—the voltage that must be withstood by the active switches can reach the value of 1830V, obtained by multiplying the effective value of the mains voltage by $\sqrt{2}$, so as to obtain the peak voltage, multiplying again by 3.6, so as to take into account the resonance of a typical resonant wave generator, and finally applying a precautionary coefficient of 1.5 that ensures a safety margin and takes into account the tolerances of the components.

Active switches capable of withstanding these voltage levels are generally not very common on the market, relatively very expensive, bulky and low-performance in terms of maximum switching frequencies, with the result of obtaining a large, expensive and less efficient converter than what is theoretically possible.

Some known solutions tackle this drawback by stacking a series of active switches, with consequent probable increase in costs, greater difficulty of controlling the active switches and more space occupied.

Another drawback of the AC/DC converters outlined above consists of the fact that they implement highly non-linear circuits, the control of which is made generally very difficult since there are only a few controllable variables without compromising the energy efficiency of the system.

Hence these AC/DC converters are very rigid and difficult to adjust, for example to deal with possible variations of the input voltage (different countries can have distribution networks at different voltage values), to deal with possible variations of power absorption by the electrical load, or to deal with possible tuning variations linked to the component not being ideal in the case of resonant circuits.

A further drawback consists of the fact that, between the rectifier and the wave generator, the primary circuit generally comprises a filtering capacity having the function of levelling and stabilising the shape of the voltage in output from the rectifier, so as to apply a voltage that can be approximated to a direct voltage in input to the high-frequency wave generator.

Being subjected to high voltage values, this filtering capacity is generally physically large and constitutes a substantial constraint both in terms of costs and in terms of space occupied by the converter. Moreover, this filtering capacity determines the further drawback of worsening the Power Factor of the converter, since it determines an impulsive absorption that it is often necessary to correct with further Power Factor Correction (PFC) stages.

The considerations and the problems outlined above are not of course limited to the case of AC/DC converters but can also occur in the case of DC/DC converters configured to transform an input direct voltage, supplied for example by a battery or by a direct voltage generator, into another direct voltage but modified with respect to the input one (e.g. greater, lesser, the same or the opposite sign).

Examples of this type of DC/DC converters are the SEPIC or LLC converter, wherein the coupling between the primary circuit and the secondary circuit is obtained through a transformer, or DC/DC converters coupled in a capacitive manner substantially according to the same ways described earlier for AC/DC converters.

SUMMARY OF THE INVENTION

In light of what has been outlined above, a purpose of the present invention is to provide a solution that makes it possible to solve, or at least substantially reduce, one or more or all of the aforementioned drawbacks of the prior art.

Another purpose is to achieve the aforementioned objective with a simple, rational and as low cost as possible solution.

Such purposes are accomplished by the characteristics of the invention given in the independent claims. The dependent claims outline preferred and/or particularly advantageous aspects of the invention.

In particular, an embodiment of the present invention provides an apparatus for transferring electrical power to an electrical load, comprising:
- a primary circuit,
- an electrical source adapted for supplying said primary circuit with a direct input voltage (or comparable to a direct voltage),
- a secondary circuit adapted for feeding the electrical load, and
- a coupling device adapted for transferring electrical power from the primary circuit to the secondary circuit, wherein the primary circuit comprises:
- a converter adapted for receiving the input voltage, for modifying said input voltage and for outputting said modified voltage, and
- a wave generator comprising at least one switching circuit provided with at least one active switch (for example MOSFET, BJT, IGBT, GaN or other), which is adapted for receiving in input the modified voltage in output from the converter, for converting said modified voltage into voltage waves and for applying said voltage waves to said coupling device, and wherein the aforementioned converter in turn comprises at least one active switch (for example MOSFET, BJT, IGBT, GaN or other) adapted for selectively allowing or preventing the passage of electrical current from the electrical source to the wave generator.

In particular, in order to reduce the number of components and therefore the costs of the system, it is preferable for the converter to comprise a single active switch adapted for selectively allowing or preventing the passage of electrical current from the rectifier to the wave generator.

Thanks to this solution, by alternately turning the active switch of the converter on and off it is for example possible to lower or increase the input voltage to the wave generator as desired.

In particular, it is possible to adjust the voltage that is applied to the wave generator, by simply varying the on-off duty-cycle of the aforementioned active switch.

Consequently, for example it is advantageously possible to lower the peak voltage that must be withstood by the active switches present in the switching circuits of the wave generator, which can be advantageously selected to be small in size, cost-effective and suitable for reaching very high switching frequencies, without compromising the efficiency thereof.

Reducing the value of the voltage also helps to decrease the electromagnetic emissions caused by the wave generator and it is also generally more suited to being used for branching voltages for the logic components (typically 5V, 3.3V and less) through linear adjusters, once the startup step has ended.

Possibly, the poor adjustment characteristics of the output voltage from the converter, desirable to minimise the space occupied by the capacities and to improve the power factor, highlighted for example by a high ripple of the input voltage to the wave generator, can be compensated by a second finer adjustment carried out by the wave generator itself.

The presence of the converter outlined above also has the advantage of increasing the degrees of freedom of the system, adding controllable variables that make it possible to simplify the adjustment of the apparatus if it is necessary, for example to tackle variations in the input voltage, variations of absorption by the electrical load, non-ideal nature of the circuit components or other.

According to an aspect of the invention, the electrical source adapted for supplying the input voltage to the primary circuit can be a simple battery or a direct current generator.

In this way, the apparatus of the invention becomes substantially a DC/DC converter. In other embodiments, the electrical source can however comprise a rectifier adapted for receiving an alternating voltage in input, supplied for example by a common electrical distribution network (e.g. 50-60 Hz, 90-250V AC), for converting (rectifying) said alternating voltage into the input voltage (direct or comparable to a direct voltage) and for supplying the primary circuit with said input voltage. In this way, the apparatus of the invention becomes substantially an AC/DC converter.

In this context, the fact that the voltage supplied to the wave generator is reduced with respect to the voltage exiting from the rectifier makes it possible to reduce the voltages to which the filtering capacity is subjected that can be used to level the input voltage, which can thus be selected smaller in size and sometimes even be eliminated, reducing the spaced occupied by the apparatus and considerably improving the power factor thereof.

According to a different aspect of the invention, the active switch of the converter can be controlled with an electric control signal having lower frequency with respect to the frequency of the electric control signal that controls the active switches of the wave generator.

In this way, it is advantageously possible to use one or more active switches in the converter, which, although they have to withstand high voltages (for example hundreds of volts), must only ensure a low operating frequency (for example kHz, tens of kHz or hundreds of kHz), reducing the dynamic losses and being able to use active switches that are not particularly high performance in terms of the dynamic characteristics and thus low cost, whilst ensuring excellent performance in terms of parasitic resistance and thus low losses.

In the wave generator it is, on the other hand, possible to use active switches that, whilst having to operate at high frequency to obtain an effective transfer of electrical power to the secondary circuit (for example hundreds of kHz, Mhz, tens of Mhz or hundreds of Mhz), must withstand only low voltages (for example tens or hundreds of volts), thus being more cost-effective and often also much higher performance.

According to an embodiment of the invention, the active switch of the converter can be arranged on a first electrical branch adapted for connecting a first output terminal of the electrical source to a first input terminal of the wave generator or, alternatively, on a second electrical branch adapted for connecting a second output terminal of the electrical source to a second input terminal of the wave generator.

In the case in which the active switch is positioned on the first electrical branch, the second electrical branch could be made simply from a conductor adapted for acting as reference potential to which both the second output terminal of the electrical source and the second input terminal of the wave generator are connected.

Thanks to this solution an extremely simple and compact converter is obtained, since it does not necessarily require the introduction of other circuit components that could complicate the apparatus and make it more expensive and bulky.

According to an aspect of this embodiment, the converter can possibly also comprise a flyback diode having cathode connected to a first intermediate node of the first electrical branch, arranged between the first output terminal of the electrical source and the first input terminal of the wave generator, and anode connected to a first intermediate node of the second electrical branch, arranged between the second output terminal of the electrical source and the second input terminal of the wave generator, the active switch being arranged on the first electrical branch, between the first output terminal of the electrical source and the first intermediate node of the first electrical branch, or alternatively on the second electrical branch, between the intermediate node of the second electrical branch and the second output terminal of the electrical source.

In this way, the flyback diode can intervene when the active switch of the converter is switched off, allowing the correct circulation of current in the switching circuit of the wave generator.

Also in this case, if the active switch of the intermediate converter is positioned on the first electrical branch, the second electrical branch could be made simply from a conductor adapted for acting as reference potential to which the second output terminal of the electrical source, the second input terminal of the wave generator and the anode of the flyback diode are connected.

According to another aspect of the embodiment outlined above, the converter can further comprise:
  an inductance arranged along the first electrical branch between the first intermediate node of the first electrical branch and the first input terminal of the wave generator, and
  a capacity having a first terminal connected to a second intermediate node of the first electrical branch, arranged between the inductance and the first input terminal of the wave generator, and a second terminal connected to a second intermediate node of the second electrical branch, arranged between the first intermediate node of the second electrical branch and the second input terminal of the wave generator.

In this way, the inductance and the capacity can make a filtering stage LC, for example a low-pass filter, which is capable of suitably levelling the voltage in input to the wave generator.

Another important advantage of this solution consists of the fact that the operating frequency of the converter is completely unconstrained from the operating frequency of the wave generator.

It should also be emphasised how the presence of the active switch and possibly of the flyback diode, of the inductance and of the capacity of the converter do not represent a worsening of costs and bulk, since they make it possible to reduce much more than proportionally the cost and the bulk of the active switches and of all of the other components of the wave generator.

According to another embodiment of the present invention, the converter could comprise:
  a first electrical branch adapted for connecting the first output terminal of the electrical source to the second input terminal of the wave generator, for example connecting them both to the same reference potential,
  a second electrical branch adapted for connecting the second output terminal of the electrical source to the first input terminal of the wave generator,
  an inductance having a first terminal connected to a first intermediate node of the first electrical branch and a second terminal connected to a first intermediate node of the second electrical branch,
  a capacity having a first terminal connected to a second intermediate node of the first electrical branch, arranged between the first intermediate node of the first electrical branch and the second input terminal of the wave generator, and a second terminal connected to a second intermediate node of the second electrical branch, arranged between the first intermediate node and the first input terminal of the wave generator, and
  a flyback diode adapted for preventing the electrical current from being able to slide through the inductance from the first intermediate node of the second electrical branch towards the first intermediate node of the first electrical branch,
wherein the active switch is arranged on the first electrical branch between the first output terminal of the electrical source and the first intermediate node of the first electrical branch or, alternatively, on the second electrical branch between the second output terminal of the electrical source and the first intermediate node of the second electrical branch.

In this way, the converter substantially assumes the circuit structure of an inverting buck-boost converter.

With respect to the schemes outlined earlier, this converter, given its buck-boost nature, has the big advantage of being able to continue to operate correctly even during the time period in which the rectified input sinusoid drops to voltages that are below the minimum operating voltage necessary for the wave generator.

This makes it possible to ensure the power transfer to the load for a greater amount of time than the network period, thus being able to further reduce or even eliminate the filtering capacity, significantly decreasing the space occupied, substantially improving the power factor, but without compromises in terms of power transfer to the load.

It should be noted how this solution provides a double sign inversion of the voltage, since the buck-boost converter is fed by the inverted terminals of the electrical source (for example of the rectifier), and thus with negative voltage, said negative voltage being inverted by the inverting buck-boost converter, therefore returning positive and suitable for feeding the wave generator.

In order to obtain this operation, if the active switch consists of a MOSFET or of another element incapable of blocking inverse voltages (for example an MOS of type N incapable of preventing the passage of current if a negative voltage is applied between drain and source), the active switch itself must be inserted with the power terminals inverted with respect to the classic buck-boost scheme.

For example, if an MOS of type N is used inserted in the first electrical branch, the drain terminal of such an MOS will be connected to the inducer and the source terminal will be connected to the electrical source (e.g. to the rectifier).

According to a different aspect of the present invention, the coupling device between the primary circuit and the secondary circuit can comprise at least one insulation capacity.

In this way it is possible to obtain a partial galvanic insulation between the primary circuit and the secondary circuit but which can be sufficient for some applications.

In other embodiments, the coupling device can, however, comprise at least two insulation capacities, so as to make a total insulation between the primary circuit and the secondary circuit.

Thanks to this solution a converter that is insulated in a capacitive manner is obtained, the main advantage of which is that of being able to occupy little space and being able to reach higher and more stable efficiency values.

In particular, the wave generator circuit does not need components suitable for working at high voltage and at high frequency simultaneously, which are notoriously expensive.

Thanks to the devised circuit, the converter makes it possible to lower the voltage to a value useful for feeding the generator circuit, working at low frequencies and high voltages, and therefore with low dynamic and static losses in the components, whereas the wave generator works at high frequencies and low voltages, therefore carrying out the galvanic insulation with high degree of miniaturisation, low cost, low losses, as well as stabilisation of the output voltage without needing large capacitors (which makes it possible to manage a wide ripple of the voltage in output from the converter—necessary to improve the quality factor and reduce the space occupied by the input capacity).

However, this does not rule out the possibility that, in other embodiments, the coupling device can comprise a transformer adapted for making an inductive coupling.

Passing to the wave generator, it can comprise any switching circuit adapted for generating voltage waves, for example according to schemes based on H bridges or half bridges.

According to a preferred aspect of the invention, the switching circuit of the wave generator is, however, a resonant switching circuit, for example similar to a circuit in class E, F, $E^{-1}$, $F^{-1}$, E/F or similar, and preferably operating in zero voltage switching (ZVS) and/or zero current switching (ZCS) mode.

The advantages of resonant circuits mainly concern the very high frequencies that can be reached, the low losses, especially when these resonant circuits are made to operate in ZVS (Zero Voltage Switching) or ZCS (Zero Current Switching) conditions, low number of switches, as well as the possibility of avoiding the presence of floating switches that would require the use of bootstrap circuits, therefore making it possible to make wave generators that are particularly compact, high-performance and cost-effective.

In particular, an embodiment of the present invention provides that the switching circuit can simply comprise a choke inductance connected to an active switch (e.g. MOSFET, BJT, IGBT, GaN or other switch), in which a central node between said choke inductance and said active switch is connected to the coupling device, for example to one of the insulation capacities or to one of the ends of the primary winding of the transformer.

This solution provides a very simple and efficient wave generator that, thanks to the presence of a single active switch, is also extremely cost-effective.

In order to make this switching circuit work in conditions of low dynamic losses, for example ensuring that the active switch is switched on and off in ZVS and/or ZCS conditions, the switching circuit outlined above can further comprise a reactance reactance, for example a tank capacity, having a first terminal connected to the central node and a second terminal connected to the free terminal of the active switch.

The switching circuit can also comprise a further reactance, for example a resonance inductance, having a first terminal connected to the central node and a second terminal connected to the coupling device, for example to one of the insulation capacities or to one of the ends of the primary winding of the transformer.

According to an embodiment of the invention, the wave generator can comprise a single switching circuit connected to the coupling device according to a Single-Ended scheme.

In practice, the switching circuit is connected to one of the two insulation capacities (or alternatively to an end of the primary winding of the transformer), whereas the other insulation capacity (if present), or alternatively the other end of the primary winding of the transformer, is simply connected to a reference electric potential.

This solution has the advantage of using a reduced number of components, reducing the costs.

On the other hand, this solution has the drawback of ensuring less power transferred to the load and a more discontinuous absorption of energy from the energy source.

According to an alternative embodiment of the invention, the wave generator can thus comprise at least two switching circuits connected to the coupling device in Push-Pull mode.

In practice, a first switching circuit could be connected to one of the two insulation capacities (or alternatively to an end of the primary winding of the transformer), whereas a second switching circuit (typically the same as the first) could be connected to the other insulation capacity (or alternatively to the other end of the primary winding of the transformer), said first and second switching circuit being controlled so as to generate mutually dephased voltage waves, for example substantially in counterphase.

In particular, the active switches of these two switching circuits could be controlled through electric control signals having the same frequency but in counterphase from one another, or almost.

This solution advantageously makes it possible to transmit more power to the load and to absorb energy from the energy source in a practically resistive manner, thus ensuring high performance and low bulk.

It is also possible to increase the number of phases for example by introducing 3, 4, 5 or more insulation branches, each of which is excited by a switching circuit, the switching circuits being controlled by mutually dephased electric control signals, in order to increase the power able to be transferred to the load.

For example, considering the generic case of using "n" phases, the electric control signals of the "n" switching circuits can be mutually dephased by a value equal to 360/n degrees.

According to another aspect of the invention, the secondary circuit can comprise a rectifier adapted for receiving the voltage waves transmitted by the coupling device, for converting said voltage waves into a direct voltage (or comparable to a voltage) and for supplying said direct voltage to the electrical load.

In this way, the apparatus of the present invention is effectively capable of feeding electrical loads that need a direct voltage.

According to a possible embodiment of the invention, the primary circuit and the secondary circuit can be installed in a single device, in practice making an AC/DC or DC/DC converter capable of transferring power to the electrical load.

In this context, the coupling device that electrically couples the two circuits can be made from inseparable components that, in the example case of a capacitive coupling, can comprise one, two or more discreet capacities.

An alternative embodiment, however, provides that the primary circuit can be installed in a feeding device and the secondary circuit can be installed in a user device, where said user device is separate, independent and mobile with respect to the feeding device.

In this way it is advantageously possible to make a wireless transfer apparatus of the electrical power between the feeding device and the user device.

In this context, the coupling device between the primary circuit and the secondary circuit must ensure a total insulation and must be made from separable components.

For example, in the case of inductive coupling, the coupling device can comprise at least one transmission coil installed on the feeding device and at least one receiving coil installed on the user device, which are capable of coupling inductively with one another for one or more specific relative positions of the user device with respect to the feeding device.

In the case of capacitive coupling, the coupling device can comprise at least two receiving plates installed in the user device and at least two transmitting plates installed in the feeding device, in which, for at least one relative position of the user device with respect to the feeding device, each receiving plate faces a corresponding transmission plate, so as to globally make the two insulation capacities.

The feeding device could also comprise multiple transmission plates, suitably arranged, so that the receiving plates of the user device can face at least two transmitting plates, for multiple positions of the user device with respect to the feeding device, and/or so that the feeding device can couple with plural user devices simultaneously.

BRIEF DESCRIPTION OF THE FIGURES

Further characteristics and advantages of the invention will become clear from reading the following description provided as a non-limiting example, with the help of the figures illustrated in the attached tables.

FIG. 2 is the scheme of a rectifier belonging to the converter of FIG. 1.

FIG. 3 schematically shows an active switch.

DETAILED DESCRIPTION

Figure 1:
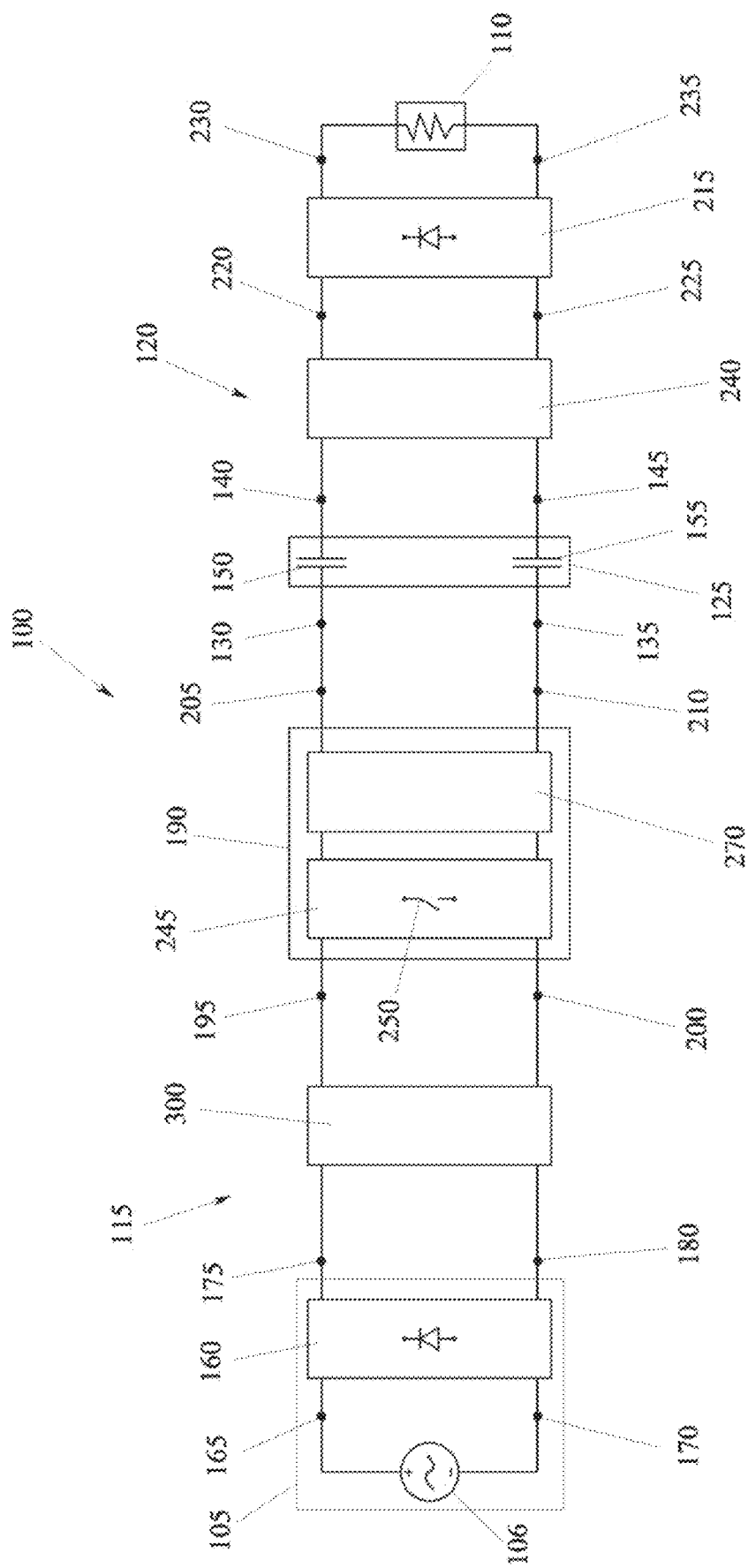
FIG. 1 is the general scheme of a converter according to an embodiment of the present invention.

An embodiment of the present invention provides an apparatus 100 for transferring electrical power from an electrical source 105 to an electrical load 110.

The electrical source 105 is generally a source of direct voltage or comparable to a direct voltage.

In accordance with the illustrated example, the electrical source 105 can comprise a rectifier, globally indicated with 160, which is adapted for receiving in input an alternating voltage coming from a source of alternating voltage 106, for example a common electrical distribution network, for converting (rectifying) said alternating voltage into a direct voltage (or comparable to a direct voltage) and for outputting said direct voltage.

The source of alternating voltage 106 can be adapted for supplying an alternating voltage of variable value depending on the country or the use (e.g. industrial or domestic).

Purely as an example, the source of alternating voltage 106 can be a 50-60 Hz, 90-250V AC network.

In general terms, the rectifier 160 can comprise a first input terminal 165 and a second input terminal 170, which can be connected to the source of alternating voltage 106, so that the latter is adapted for applying an electric voltage difference that varies in an alternating manner (alternating voltage) between these terminals.

For example, the second input terminal 170 of the rectifier 160 can be connected to a constant reference voltage, for example to ground, and the source of alternating voltage 106 can be adapted for applying a voltage that varies in a sinusoidal manner over time around the average value defined by the reference voltage to the first input terminal 165 of the rectifier 160.

The rectifier 160 can further comprise a first output terminal 175 and a second output terminal 180 between which the direct electrical voltage difference obtained from the conversion of the alternating voltage received in input is applied, where the value of the electrical voltage applied to the first output terminal 175 is generally not less than the electrical voltage value applied to the second output terminal 180.

For example, a constant voltage equal to the reference voltage can be applied to the second output terminal 180, whereas a pulsed voltage, with values not below the reference voltage, which is obtained by the rectification of the input alternating voltage, can be applied to the first output terminal 175.

As illustrated in FIG. 2, the rectifier 160 can be a rectifier based on a diode bridge (for example Graetz bridge) but this does not rule out the possibility that, in other embodiments, it can be a rectifier with a single diode, with combined double diode, a synchronous rectifier or other.

Possibly, one or more of the diodes of the rectifier 160 can be replaced with active switches, so as to reduce losses.

Immediately downstream of the rectifier 160 there can possibly be a filtering capacity 185 having a first terminal connected to the first output terminal 175 and a second terminal connected to the second output terminal 180, the function of which is to make a capacitive filter capable of stabilizing the voltage difference between the first and the second output terminal 175 and 180 of the rectifier 160, levelling it at a substantially constant value or in any case with less difference between RMS voltage and mean voltage of the rectified wave, and therefore comparable to a constant voltage over time (apart from a possible residual ripple as large as desired that depends on the balancing between the capacitive value of the condenser 185 and the power to be absorbed by the source), in practice obtaining a voltage comparable in the first instance to a direct voltage.

It should be noted how the filtering capacity 185 could be eliminated if there is a stage capable of acting as correction circuit of the power factor (PFC).

In other embodiments, the electrical source 105 could simply be a battery, a direct voltage generator or any other direct voltage source adapted for directly applying a direct voltage between the first output terminal 175 and the second output terminal 180, eliminating the rectifier 160.

The electrical load 110, which is generically represented with the symbol of an electrical resistance in FIG. 1, can be any electrical or electronic device that must be fed electrically to allow the operation thereof and/or to charge the internal batteries of the device itself.

Classic examples of this type of electric/electronic device are in particular computers, tablets, smartphones, television sets, domestic appliances, automated systems, servers and others.

The apparatus 100 schematically comprises a primary electric circuit 115, directly connected to the electrical source 105, and a secondary electric circuit 120, able to be directly connected with the electrical load 110, which are electrically coupled with each other by means of a coupling device 125 adapted for allowing the passage of electrical energy between the primary circuit 115 and the secondary circuit 120.

In general terms, the coupling device 125 can comprise at least one first input terminal 130 and a second input terminal 135, through which it is connected to the primary circuit 115, as well as a first output terminal 140 and a second output terminal 145, through which it is connected with the secondary circuit 120.

In the illustrated preferred embodiment, the coupling device 125 comprises at least two insulation capacities, including a first insulation capacity 150, the ends of which respectively define the first input terminal 130 and the first output terminal 140, and a second insulation capacity 155, the ends of which respectively define the second input terminal 135 and the second output terminal 145.

However, this does not rule out the possibility that, in other embodiments, the coupling device 125 can comprise a transformer (not illustrated) equipped with a primary winding and with a secondary winding magnetically coupled with each other, where the opposite ends of the primary winding respectively define the first input terminal 130 and the second input terminal 135, whereas the opposite ends of the secondary winding respectively define the first output terminal 140 and the second output terminal 145.

In these ways, the coupling device 125 is advantageously capable of galvanically insulating the primary circuit 115 from the secondary electric circuit 120 to ensure safety of use and strength.

However, if a complete galvanic insulation is not necessary, the coupling device 125 could for example comprise a single insulation capacity, for example only the first insulation capacity 150, whereas the second input terminal 135 and the second output terminal 145 could be connected to a same reference voltage potential, for example connected together by a common conductor.

The primary circuit 115 also comprises a wave generator, globally indicated with 190, which is adapted for being fed by the rectifier 160 to generate a voltage wave, i.e. a succession of voltage pulses that follow one another with a predetermined frequency and in which each voltage pulse varies from a minimum value to a maximum value.

Preferably, the wave generator 190 is adapted for generating a high-frequency voltage wave, typically of the order of hundreds of KHz, MHz, tens of MHz or hundreds of MHz.

In general terms, the wave generator 190 can comprise a first input terminal 195 and a second input terminal 200, between which a voltage difference is applied that is obtained from the rectified voltage supplied by the rectifier 160, where the value of the electrical voltage applied to the first input terminal 195 is generally above the electrical voltage value applied to the second input terminal 200.

The wave generator 190 can also comprise a first output terminal 205 and a second output terminal 210, between which a voltage difference is applied that is periodically variable over time, which represents the voltage wave and which is obtained through suitable conversion of the voltage received in input.

The first output terminal 205 and the second output terminal 210 are respectively connected to the first input terminal 130 and to the second input terminal 135 of the coupling device 125, for example to the first insulation capacity 150 and to the second insulation capacity 155, respectively.

In this way, the electrical voltage wave in output from the wave generator 190 is transferred by the coupling device 125 to the secondary circuit 120 of the converter 100.

In practice, a voltage difference that is periodically variable over time (voltage wave) that the wave generator 190 applies between the first and the second input terminal 130 and 135 of the coupling device 125, generates a corresponding voltage difference that is periodically variable over time (voltage wave) between the first and the second output terminal 140 and 145 that are connected to the secondary circuit 120.

The secondary circuit 120 can comprise a rectifier 215, which is adapted for rectifying the electrical voltage wave in output from the coupling device 125, so as to convert said voltage wave and obtained a rectified voltage in output that is useful for feeding the electrical load 110.

The rectifier 215 can thus generally comprise a first input terminal 220, connected with the first output terminal 140 of the coupling device 125, and a second input terminal 225, connected with the second output terminal 145, between which the voltage wave coming from the primary circuit 115 is applied.

The rectifier 215 can also comprise a first output terminal 230 and a second output terminal 235, between which a rectified electrical voltage different obtained by the conversion of the voltage wave in input is applied, where the value of the electrical voltage applied to the first output terminal 230 is generally not less than the electrical voltage value applied to the second output terminal 235.

The rectifier 215 can be a rectifier based on a diode bridge (for example Graetz bridge), a rectifier with a single diode, with combined double diode, a synchronous rectifier or other rectifying method.

Also in this case, immediately downstream of the rectifier 215 there can possibly be a filtering stage capable of stabilizing the voltage difference between the first and the second output terminal 230 and 235, levelling it at a substantially constant value or in any case more constant over time (except for possible residual ripples), in practice obtaining a voltage comparable to a direct voltage.

The first and the second output terminal 230 and 235 of the rectifier 215 are finally able to be connected to the ends of the electrical load 110, so as to electrically feed it.

It should be observed that, in some embodiments, the rectifier 215 could be absent, thus obtaining a converter 100 capable of feeding the electrical load 110 with an alternating voltage.

Alternatively, the rectifier 215 could be replaced by an AC/AC or DC/AC converter in the case in which the load 110 needs to be fed in alternating voltage but requires a wave with different characteristics from that produced by the wave generator 190.

Possibly, downstream of the coupling device 125, for example between the coupling device 125 and rectifier 215 if present, the secondary circuit 120 can also include a reactive network 240, comprising one or more reactances (e.g. capacity and/or inductors), which is adapted for ensuring a correct tuning of the system with a different load from that useful for transmitting the desired power.

Going into greater detail, in order to generate the voltage wave to be applied to the coupling device 125, the wave generator 190 generally comprises at least one switching circuit 245, i.e. a circuit equipped with at least one active switch 250, for example a transistor (e.g. bipolar junction transistor BJT, field effect transistor FET, MOSFET, MESFET, JFET, IGBT, GaN and others), which is adapted for turning on and off (i.e. going into saturation and in prevention) upon the command of an electric control signal.

As illustrated in FIG. 3, the active switch 250 can generally comprise a first connection terminal 255 (e.g. the drain in the case of a MOSFET of type N), a second connection terminal 260 (e.g. the source in the case of a MOSFET of type N) and a control terminal 265 (e.g. the gate in the case of a MOSFET of type N), and is configured to allow or selectively prevent the passage of current between the first and the second electrical connection terminal 255 and 260 as a function of the electric control signal applied to the control terminal 265.

The electric control signal can be a square wave electrical signal, which can have a constant frequency and, generally but not necessarily, a duty cycle equal to 50%.

In order to obtain the voltage wave outlined earlier, the frequency of the electric control signal, which in practice corresponds to the switching frequency of the active switch 250, is generally selected as a very high value, for example of the order of hundreds of KHz, MHz, tens of MHz or hundreds of MHz.

The electric control signal can be generated by a suitable driver (not illustrated), which can be installed in the converter 100, for example in the primary circuit 115 or in the secondary circuit 120, or it can be installed on an external device, for example on the device that carries the electrical load 110 to be fed.

In this second case, the electric control signal can be transmitted by the external device to the converter 100 through any system capable of transferring electrical signals.

In general, the wave generator 190 can implement any switching circuit 245 capable of generating high-frequency voltage waves, for example according to schemes based on H bridges or half bridges.

However, it is preferable for the switching circuit 245 to be a resonant switching circuit, i.e. for it to comprise, as well as the aforementioned active switch 250, also a resonant reactive circuit 270, for example a completely resonant or quasi-resonant reactive circuit.

The resonant reactive circuit 270 is in general an electric circuit that comprises one or more reactances, for example one or more condensers and/or inducers, which are suitably connected to one another and tuned so as to resonate at a given frequency.

The tuning of the resonant reactive circuit 270 substantially consists of the sizing of the aforementioned reactances, in terms of capacity and electrical inductance, respectively.

In this case, the resonant reactive circuit 270 is preferably tuned so as to lower the electrical power (e.g. voltage and/or current) applied to the active switch 250 to a substantially zero value, during every transition phase from off to on and vice-versa, in this way obtaining a resonant switching circuit 245 operating in Zero Voltage Switching (ZVS) and/or Zero Current Switching (ZCS) mode.

For example, the resonant reactive circuit 270 can be tuned so as to resonate at a frequency equal or close to the control frequency of the active switch 250.

In this way, the electrical losses are substantially reduced during the switching cycles of the active switch 250, making it possible to increase the frequency of such cycles and thus the frequency of the voltage wave generated by them, with the result of being able to increase the electrical power transmitted for the same voltage applied, or being able to lower the voltage applied for the same electrical power transmitted.

For the same electrical power transmitted, increasing the frequency of the electrical voltage wave also makes it possible to reduce the size of all of the reactive components, for example of the insulation capacities 150 and 155.

It should be specified here that, although the resonant reactive circuit 270 is represented on the primary circuit 115, upstream of the coupling device 125, the resonant reactive circuit 270 could alternatively be arranged on the secondary circuit 120, downstream of the coupling device 125, for example between the latter and the rectifier 215 if present, or it could comprise both components (reactances) arranged upstream and components (reactances) arranged downstream of the coupling device 125.

In some embodiments, the resonant reactive circuit 270 could also comprise components of the coupling device 125, for example the insulation capacities 150 and 155.

Figure 4:
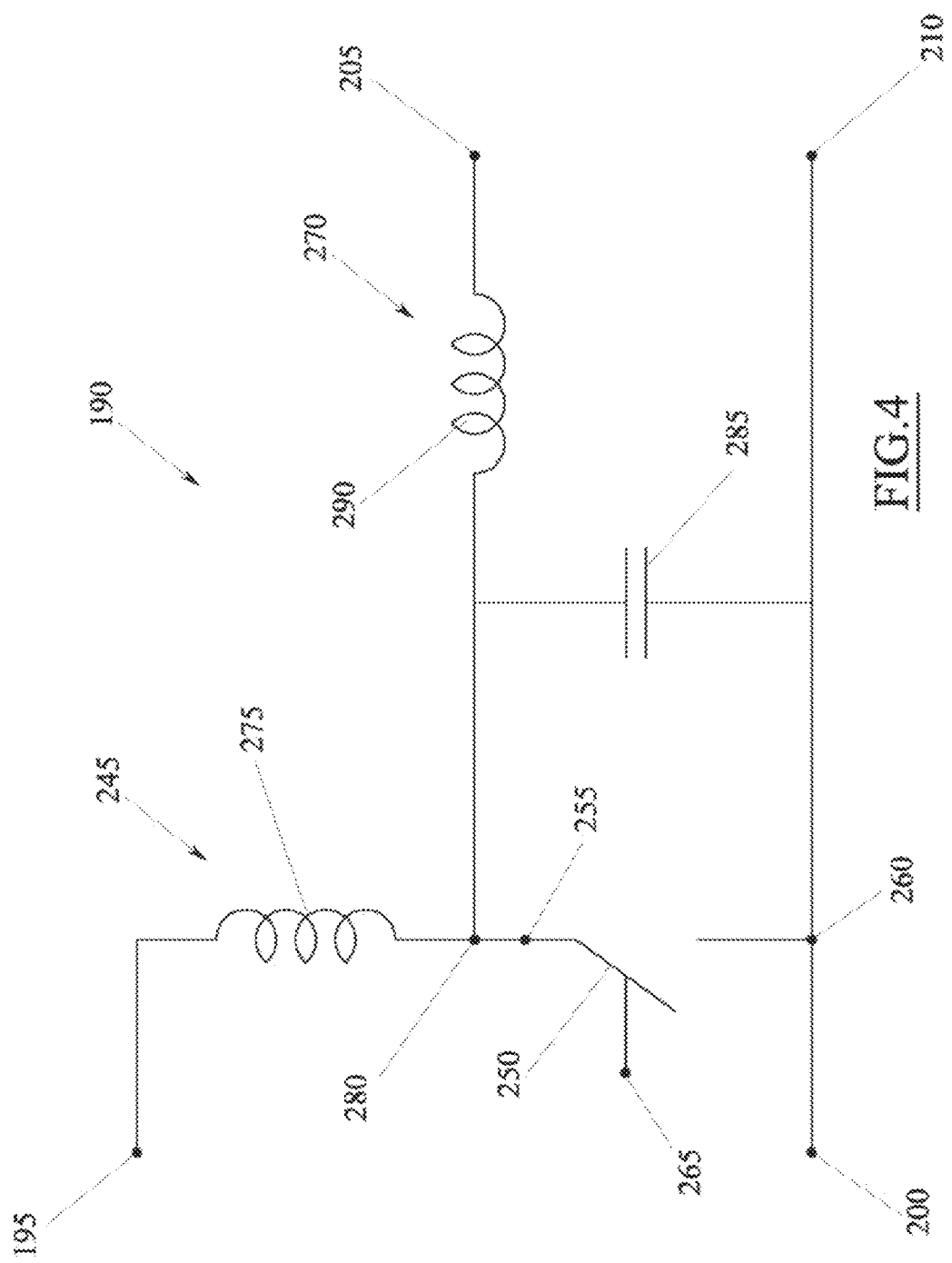
FIG. 4 is the scheme of a first embodiment of a wave generator belonging to the converter of FIG. 1.

Based on these considerations, a possible embodiment of the switching circuit 245 is illustrated in FIG. 4.

In this embodiment, the switching circuit 245 comprises a choke inductance 275 having a terminal connected to the first input terminal 195 of the wave generator 190 and the opposite terminal connected to the first connection terminal 255 of the active switch 250 (for example to the drain of a MOSFET of type N).

The second connection terminal 260 of the active switch 250 (for example the source of a MOSFET of type N) can be connected to the second input terminal 200 of the wave generator 190.

The first output terminal 205 of the wave generator 190 can be connected to a central node 280 comprised between the choke inductance 275 and the active switch 250.

The second output terminal 210 of the wave generator 190 can be directly connected to the second connection terminal 260 of the active switch 250 and, with it, to the second input terminal 200 of the wave generator 190.

The switching circuit 245 can further comprise a tank capacity 285, having a terminal connected to the central node 280 and the opposite terminal connected to the second connection terminal 260 of the active switch 250.

The switching circuit 245 can finally comprise an inductance 290 arranged between the central node 280 and the first output terminal 205 of the wave generator 190, i.e. having a terminal connected to the central node 280 and the opposite terminal connected with the first output terminal 205.

In some embodiments further reactive elements can be introduced, for example a LC series resonator in parallel with the tank capacity 285, typically useful for making the circuit stronger with respect to variations of the load 110, without this significantly changing the invention illustrated.

In the illustrated circuit, when the active switch 250 is turned on, the choke inductance 275 charges.

When, on the other hand, the active switch 250 is turned off, the current flows towards the coupling device 125 discharging the choke inductance 275.

Since the active switch 250 turns on and off alternately following the control signal, successive voltage pulses are applied to the coupling device 125, said pulses globally forming the aforementioned voltage wave, which is thus transferred to the secondary circuit 120 and therefore applied to the electrical load 110.

During the on and off cycles of the active switch 250, the choke inductance 275 undergoes continuous charging and discharging cycles.

Concerning this, in some embodiments, the choke inductance 275 can be sized so that its value is sufficiently large as to operate in Continuous Current Mode (CCM), i.e. so as to be able to consider the current that passes through it as constant.

In other embodiments, it may however be preferable to size the choke inductance 275 with lower values with respect to the previous solution, so as to make it completely discharge at every turning on cycle of the active switch 250, or even to make it charge with inverse current before the subsequent activation of the switch 250.

In other words, it is possible to size the choke inductance 275 to make the current that passes through it oscillate between a maximum value and zero, or between a positive maximum value and a negative minimum value.

In this way, the value of the choke inductance 275 is drastically reduced, with the consequence of being able to keep down the space occupied, the weight and being able to use more cost-effective, compact and efficient inductances, at the expense clearly of the RMS currents in the circuits and in the components, which are higher with respect to the CCM case.

In the case illustrated above, the resonant reactive circuit 270 comprises the inductance 290 and possibly the tank capacity 285.

The resonant reactive circuit 270 can also comprise the components of the coupling device 125, for example the insulation capacities 150 and 155, and possibly other reactances comprised between the central node 280 of the switching circuit 245 and the electrical load 110, including for example the reactances of the reactive adaptation network 240.

As stated earlier, the resonant reactive circuit 270 is tuned so that the electrical power (e.g. voltage and/or current) applied to the active switch 250 has a substantially zero value during every transition phase of said active switch 250 from off to on and from on to off.

As well as this, the resonant reactive circuit 270 normally also acts as bandpass filter for the voltage wave that is transferred between primary circuit 115 and secondary circuit 120.

The band of frequencies that are allowed to pass from said filter also depends on the tuning of the resonant reactive circuit 270.

Concerning this, it is preferable for the resonant reactive circuit 270 to be tuned so as to pass one or more of the fundamental frequencies of the voltage wave.

Considering the example case in which the active switch 250 is controlled with a square wave electrical signal having duty-cycle equal to 50%, the fundamental frequencies of the voltage wave are the odd ones: the first, the third, the fifth and so on. The resonant reactive circuit 270 can thus be tuned so as to allow the first fundamental frequency of the electrical voltage wave to pass, in which case the switching circuit 245 is actually comparable to an amplifier of class "E".

Alternatively, the resonant reactive circuit 270 can be tuned so as to allow the third fundamental frequency of the electrical voltage wave, or other odd harmonics, to pass, in which case the switching circuit 245 is actually comparable to an amplifier of class "F".

However, this does not rule out the possibility that the resonant reactive circuit 270 can be tuned so as to allow fundamental frequencies of higher order to pass, or to allow many fundamental frequencies to pass simultaneously, obtaining for example schemes similar to amplifiers of class "$E^{-1}$", "$F^{-1}$", "E/F" or similar, or other resonant schemes characterised by transitions of type ZVS and/or ZCS.

In the specific embodiment illustrated in FIG. 4, the wave generator 190 comprises a single switching circuit 245, which is connected to the coupling device 125 according to a Single Ended scheme.

This scheme has the advantage of the reduced number of components, but has the drawback of ensuring a limited power transferred to the electrical load 110 and a very discontinuous absorption of energy by the electrical source 105, in particular in the presence of choke inductances 275 of reduced value, for example tens of nH or hundreds of nH.

Figure 5:
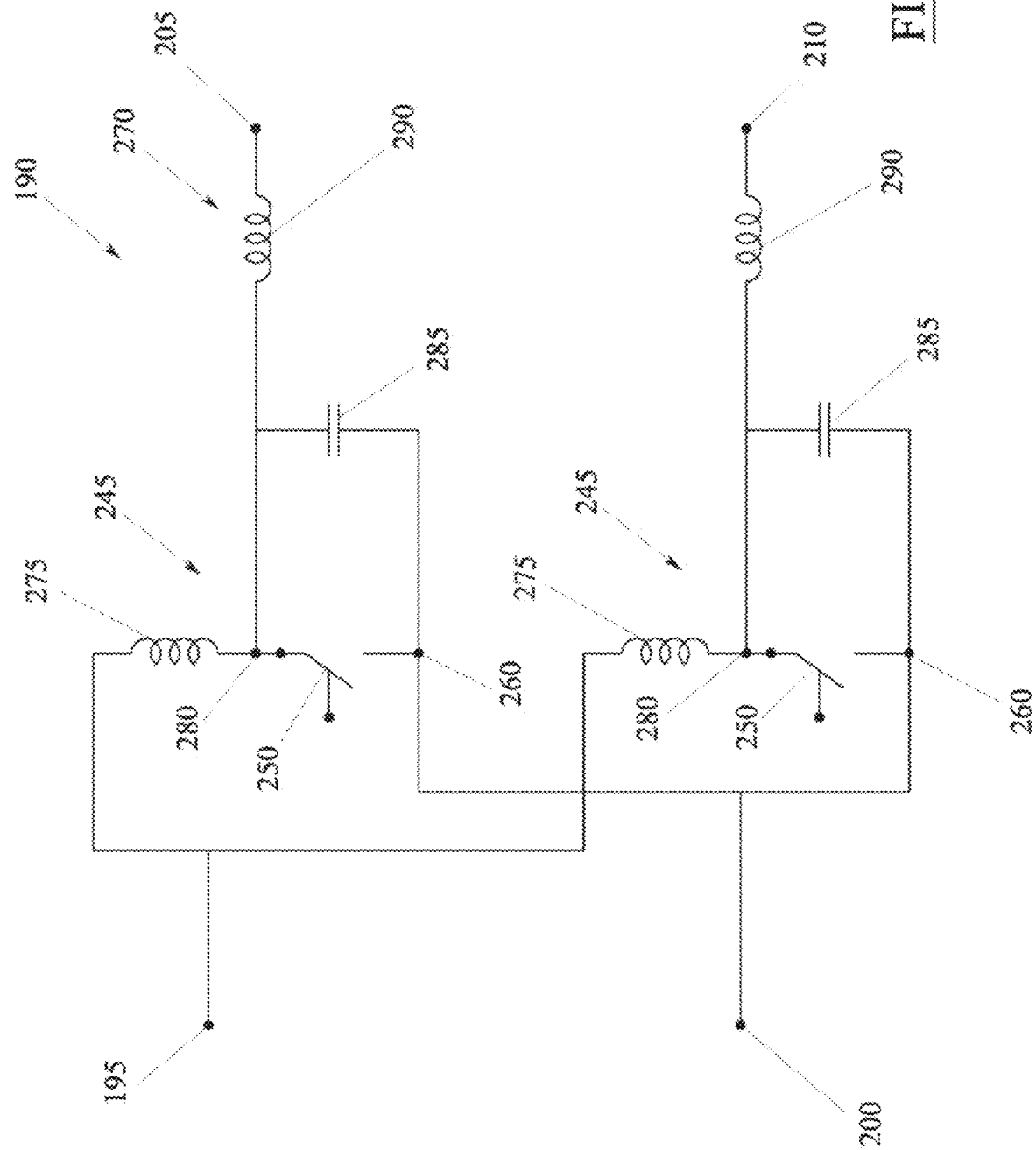
FIG. 5 is the scheme of a second embodiment of a wave generator belonging to the converter of FIG. 1.

For this reason, other embodiments can provide that the wave generator 190 comprises two switching circuits 245, for example two switching circuits 245 that are the same as each other and individually analogous to that outlined above, which can be connected to the coupling device 125 according to a Push-Pull scheme as illustrated in FIG. 5.

In practice, the first input terminal 195 of the wave generator 190 can be connected to the free terminal of the choke inductance 275 of both of the switching circuits 245.

In order to close the circuit, the second input terminal 200 can be connected to the second connection terminal 260 of the active switches 250 of both of the switching circuits 245.

The first output terminal 205 of the wave generator 190 can be connected, possibly with the interposition of the inductance 290 and/or of other reactances, with the central node 280 of a first switching circuit 245.

The second output terminal 210 can be connected, possibly with the interposition of the inductance 290 and/or of other reactances, with the central node 280 of the second switching circuit 245.

The active switches 250 of the two switching circuits 245 can be controlled through respective control signals, so as to generate mutually dephased voltage waves, for example substantially in counter-phase.

In other words, the control signals applied to the active switches 250 can have the same frequency but can be dephased from one another, for example in counter-phase.

This wave generator 190 of the Push-Pull type makes it possible to transmit more power to the load and to absorb energy from the electrical source 105 in a practically resistive manner, even if the choke inductances 275 of the two switching circuits 245 have very small values, thus ensuring high performance and reduced bulk.

A problem that can arise with a converter 100 according to all of the embodiments outlined above consists of the fact that the active switches 250 of the wave generator 190, especially when inserted in a switching circuit 245 of the resonant type, could be subjected to particularly high peak voltages, in order to withstand which it would be necessary to select vary expensive and generally low performance active switches in terms of maximum usage frequencies and of channel resistance.

In order to overcome this drawback, the converter 100 can comprise an intermediate converter, globally indicated with 300 in FIG. 1, which is adapted for receiving in input the rectified voltage in output from the rectifier 160, for reducing the average value of said rectified voltage and thus for outputting, i.e. supplying in input to the wave generator 190, said rectified voltage of reduced average value.

Figure 6:
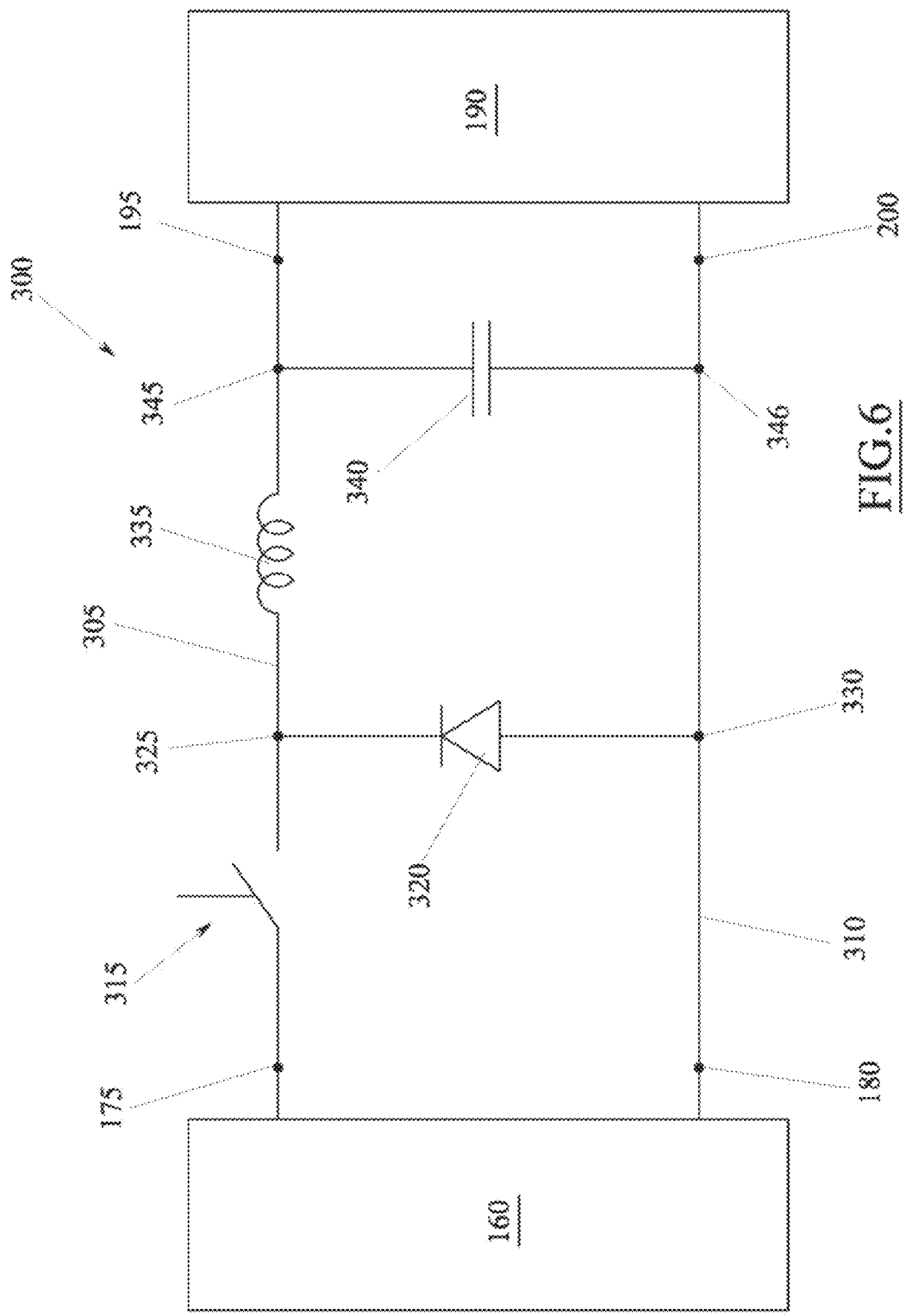
FIG. 6 is the scheme of a first embodiment of a converter belonging to the converter of FIG. 1.

According to a possible embodiment illustrated in FIG. 6, the converter 300 can be made in the form of a buck converter.

In practice, this converter 300 can comprise a first electrical branch 305 adapted for connecting the first output terminal 175 of the rectifier 160 to the first input terminal 195 of the wave generator 190, a second electrical branch 310 adapted for connecting the second output terminal 180 of the rectifier 160 to the second input terminal 200 of the wave generator, and an active switch 315, for example a transistor (e.g. BJT, FET, MOSFET, MESFET, JFET, IGBT, GaN or others), which can be arranged on the first electrical branch 305 to selectively prevent or allow the passage of electrical current between the rectifier 160 and the wave generator 190.

In other embodiments, the active switch 315 could be arranged on the second electrical branch 310, without modifying the operation of the converter 300 and eliminating the need for bootstrap circuits to control the active switch 315 itself.

The active switch 315 has the same general characteristics described earlier and can thus be controlled by a suitable control signal, so as to turn on and off cyclically at a frequency corresponding to the frequency of the control signal.

Preferably, the frequency of this control signal, and therefore the operating frequency of the active switch 315, is less than the operating frequency of the active switches 250 of the wave generator 190, for example of the order of kHz, tens of kHz or hundreds of kHz.

In this way, although it has to withstand high voltages (for example hundreds of volts), the active switch 315 of the converter 300 must ensure only low operating frequencies and relatively low currents, reducing the dynamic and static losses and also being relatively cost-effective.

The converter 300 can further comprise a flyback diode 320 having cathode connected to a first intermediate node 325 of the first electrical branch 305, i.e. arranged between the first output terminal 175 of the rectifier 160 and the first input terminal 195 of the wave generator 190, and anode connected to a first intermediate node 330 of the second electrical branch 310, i.e. arranged between the second output terminal 180 of the rectifier 160 and the second input terminal 200 of the wave generator 190.

In this case, the active switch 315 can be arranged on the first electrical branch 305, between the first output terminal 175 of the rectifier 160 and the first intermediate node 325 (as illustrated in the figures), or alternatively on the second electrical branch 310, between the second output terminal 180 of the rectifier 160 and the first intermediate node 330.

The converter 300 can further comprise an inductance 335 arranged on the first electrical branch 305, between the first intermediate node 325 and the first input terminal 195 of the wave generator 190, as well as a capacity 340 having a first terminal connected to a second intermediate node 345 of the first electrical branch 305, arranged between the inductance 335 and the first input terminal 195 of the wave generator 190, and a second terminal connected to a second intermediate node 346 of the second electrical branch 310, arranged between the first intermediate node 330 and the second input terminal 200 of the wave generator 190.

It is deemed suitable to observe that, in the illustrated example, the first and the second intermediate node 330 and 346 of the second electrical branch 310 are directly connected by a simple conducting segment, for which reason they substantially define a single electrical node.

In practice, the inductance 335 and the capacity 340 make an LC filter, for example a low-pass filter, which is capable of levelling the voltage in output from the converter 300.

Thanks to the scheme illustrated above, the operating frequency of the converter 300 is completely unconstrained from the operating frequency of the wave generator 190. Therefore, by alternately turning the active switch 315 on and off it is advantageously possible to adjust the output voltage from the converter 300 and, therefore, the feed voltage of the wave generator 190 as desired.

This results in the possibility of reducing the peak voltage withstood by the active switches 250 of the wave generator 190, making it possible to use active switches of low voltage (for example tens or hundreds of volts) and high frequency (hundreds of kHz, Mhz, tens of Mhz or hundreds of Mhz), which are generally inexpensive and tendentially very efficient.

The fact that the feed voltage of the wave generator 190 is reduced as desired also makes it possible to reduce the value, and therefore the size, of the filtering capacity 185 that can be present in the rectifier 160.

The low adjustment characteristics of the output voltage from the converter 300, which can produce a high ripple of the feed voltage of the wave generator 190, can be compensated through a fine adjustment of the wave generator 190 itself.

In this way, as well as being able to keep the operating frequency of the converter 300 low and limit the size of the filtering capacity 185, it is advantageously possible to also keep the size of the inductance 335 and of the capacity 340 low.

On the other hand, the presence of the active switch 315, of the flyback diode 320, of the inductance 335 and of the capacity 340 do not represent a worsening of the costs and of the space occupied by the converter 100, since they make it possible to reduce much more than proportionally the cost and the space occupied by the active switches 250 of the wave generator 190, of the choke inductances 275, of the tank capacities 285 and of the filtering capacity 185.

The fact that the voltage supplied is reduced as desired also makes it possible, for any electrical source 105, to always supply the wave generator 190 with the most suitable voltage and, therefore, to keep the circuit component after the converter 300 unchanged for any type of input voltage applied to the apparatus 100, a very advantages condition for example in the case of universal converters, which must operate throughout the world.

This type of converter 300 can be applied both in the case in which the wave generator 190 is configured according to a Single-Ended scheme, like for example the one illustrated in FIG. 4, and in the case in which the wave generator 190 is configured according to a Push-Pull scheme, like for example the one illustrated in FIG. 5.

Figure 7:
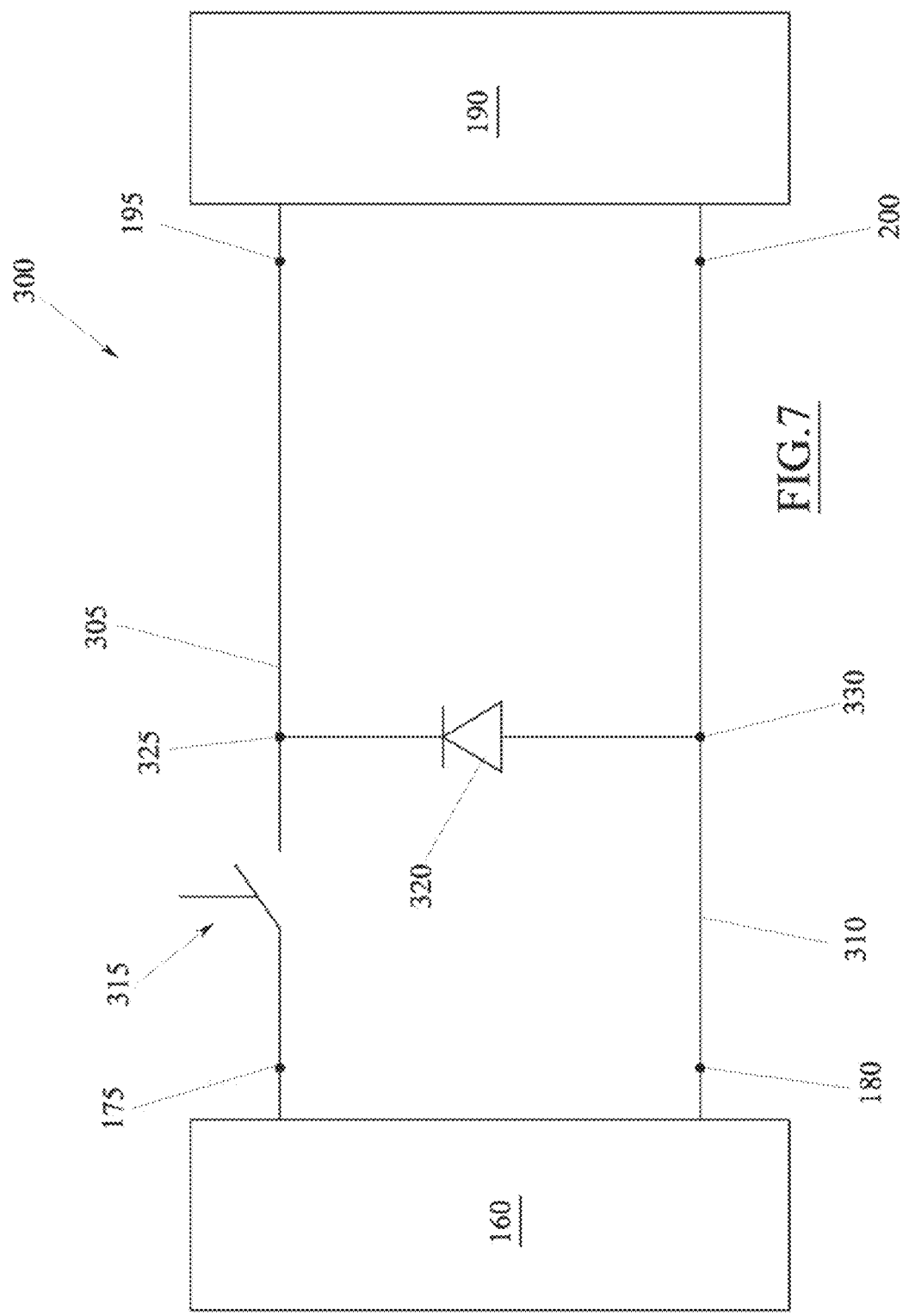
FIG. 7 is the scheme of a second embodiment of a converter belonging to the converter of FIG. 1.

In order to substantially reduce costs and the space occupied by the converter 100, it is however possible to simplify the converter 300 eliminating the LC filter as illustrated in FIG. 7.

In practice, the converter 300 according to this hybrid form comprises only a first electrical branch 305 adapted for connecting the first output terminal 175 of the rectifier 160 to the first input terminal 195 of the wave generator 190, a second electrical branch 310 adapted for connecting the second output terminal 180 of the rectifier 160 to the second input terminal 200 of the wave generator 190, a flyback diode 320 having cathode connected to the first intermediate node 325 of the first electrical branch 305 and anode connected to the first intermediate node 330 of the second electrical branch 310, and an active switch 315, for example a transistor (e.g. BJT, FET, MOSFET, MESFET, JFET, IGBT, GaN or others), which can be arranged on the first electrical branch 305, between the first output terminal 175 of the rectifier and the first intermediate node 325, or on the second electrical branch 310, between the second output terminal 180 of the rectifier 160 and the first intermediate node 330.

This type of hybrid converter 300 can be applied both in the case in which the wave generator 190 is configured according to a Single-Ended scheme, like for example the one illustrated in FIG. 4, and in the case in which the wave generator 190 is configured according to a Push-Pull scheme, like for example the one illustrated in FIG. 5.

However, its operation is particularly effective when the controls of the active switch 315 of the converter 300 are able to be kept independent from the control of the active switches 250 of the wave generator 190, for example selecting choke inductances 275 of sufficiently great value as to operate in Continuous Current Mode conditions or using as wave generator 190 according to a Push-Pull scheme.

Regardless of this, there are however control strategies of the converter 300 that make it possible to minimise the size of the choke inductances 275 and to reduce to global losses.

In particular, it is particularly advantageous to turn on the active switch 315 in a moment of turning on the active switch 250 of the wave generator 190, to keep it turned on for a certain time $T_{on}$ during which the active switch 250 continues to repeatedly turn on and off for a certain number of cycles, and thus to turn off the active switch 315 in a moment of turning off of the active switch 250.

Figure 8:
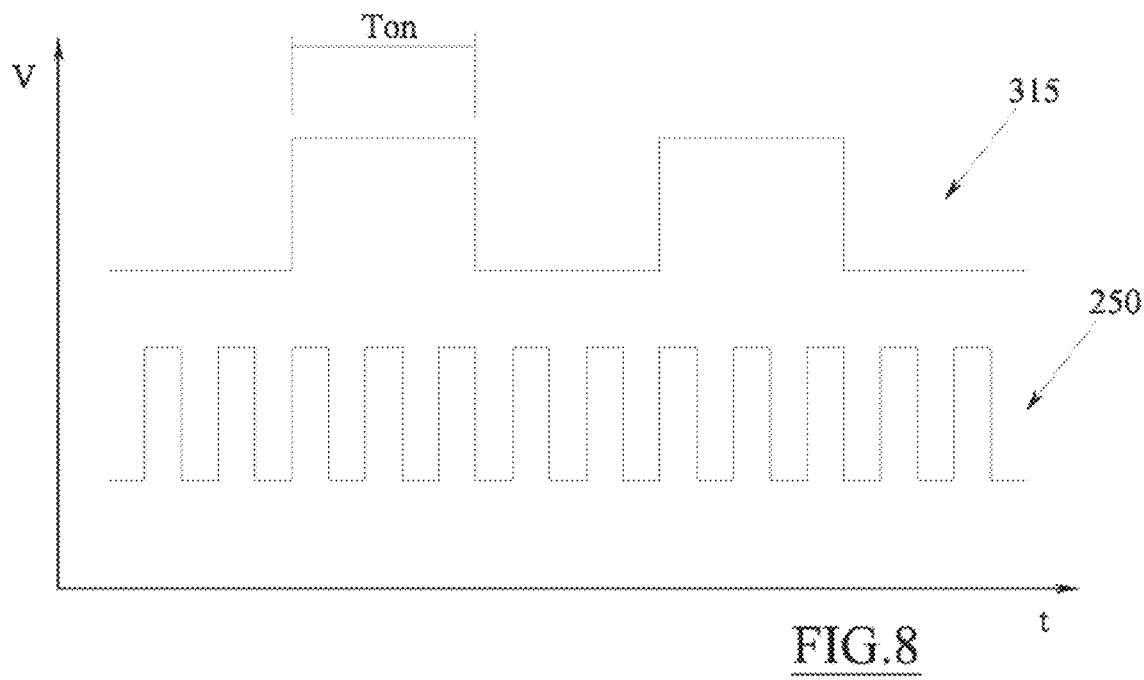
FIG. 8 shows the control signals used in the converter and in the voltage generator of the converter according to a possible control strategy.

FIG. 8 shows an example of this synchronous control of the active switch 315 of the converter 300 with respect to the control of the active switch 250 of the wave generator 190.

This type of control is particularly effective if the wave generator circuit 190 is of the Push-Pull type, as for example illustrated in FIG. 5, since it is characterised by resistive absorption, or if the choke inductance 275 is sized so as to discharge, and therefore have zero or extremely low current, in the moment of turning on of the active switch 315 of the converter 300.

It should be noted how a converter 300 of this type provides for the repetition of a macro-phase, in which the active switch 250 of the wave generator 190 is turned on and during which the energy accumulated in the choke inductance 275 is increased on average, followed by a macro-phase, in which the active switch 250 is turned off and during which the energy accumulated in the choke inductance 275 is decreased on average.

The flyback diode 320 intervenes in particular when the active switch 315 of the converter 300 is turned off and the active switch 250 of the wave generator 190 is turned on, allowing the correct circulation of current in the choke inductance 275.

Figure 9:
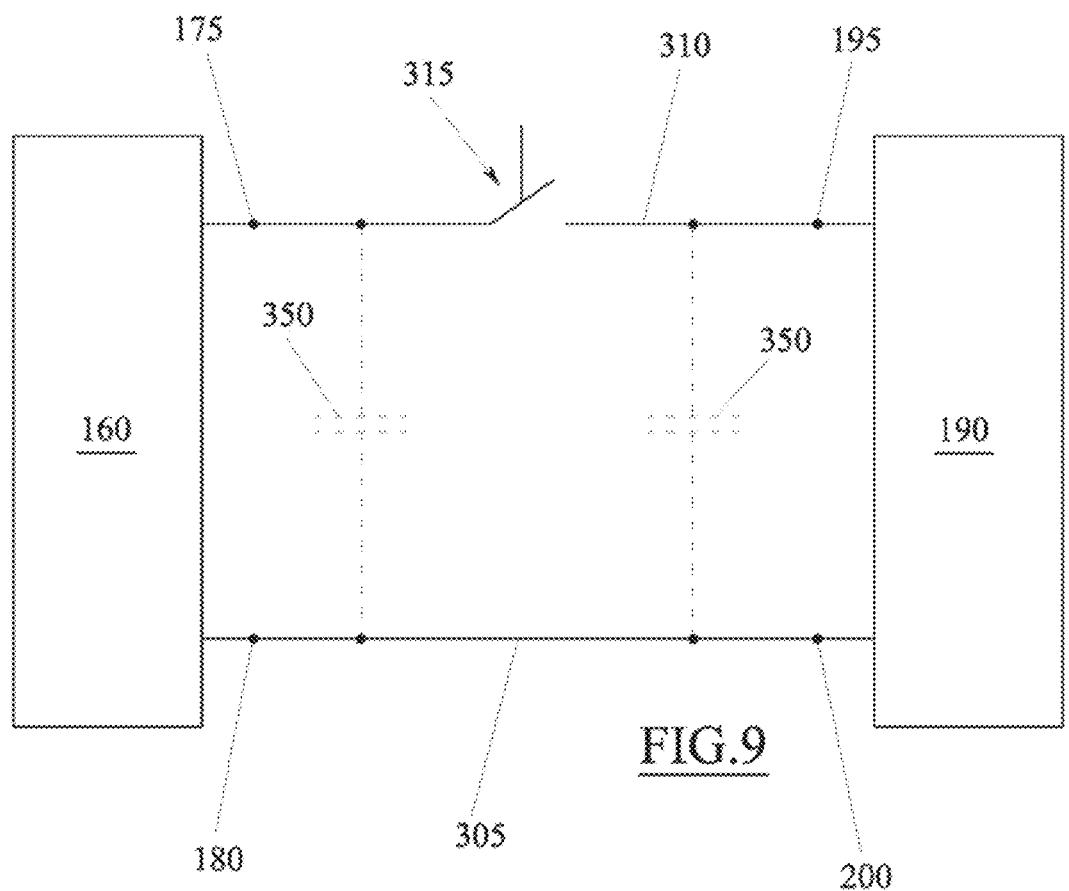
FIG. 9 is the scheme of a third embodiment of a converter belonging to the converter of FIG. 1.

However, it is clear that, if the wave generator 190 uses a Push-Pull scheme, like for example the one illustrated in FIG. 5, except for non-ideal conditions, the flyback diode 320 is not essential and can be undersized or even removed as indicated in the embodiment illustrated in FIG. 9.

It should be observed how in this last variant, the converter 300 can optionally comprise one or more storage capacities 350 having its own terminals connected respectively to the first electrical branch 305 and to the second electrical branch 310, which can be suitably positioned upstream and/or downstream of the active switch 315.

Concerning this, it should be highlighted that one or more of these storage capacities 350 could also be present in the converters 300 according to the schemes illustrated earlier.

The converters 300 described up to now have the undoubted advantage of simplicity, and allow the reduction or even elimination of the filtering capacity 185 in output from the rectifier 160, minimising the space occupied and the costs of the converter 100.

They are thus particularly suitable in low-power consumer applications, in which typically good power factors and high efficiency are needed, with extremely reduced costs and space occupied.

Figure 10:
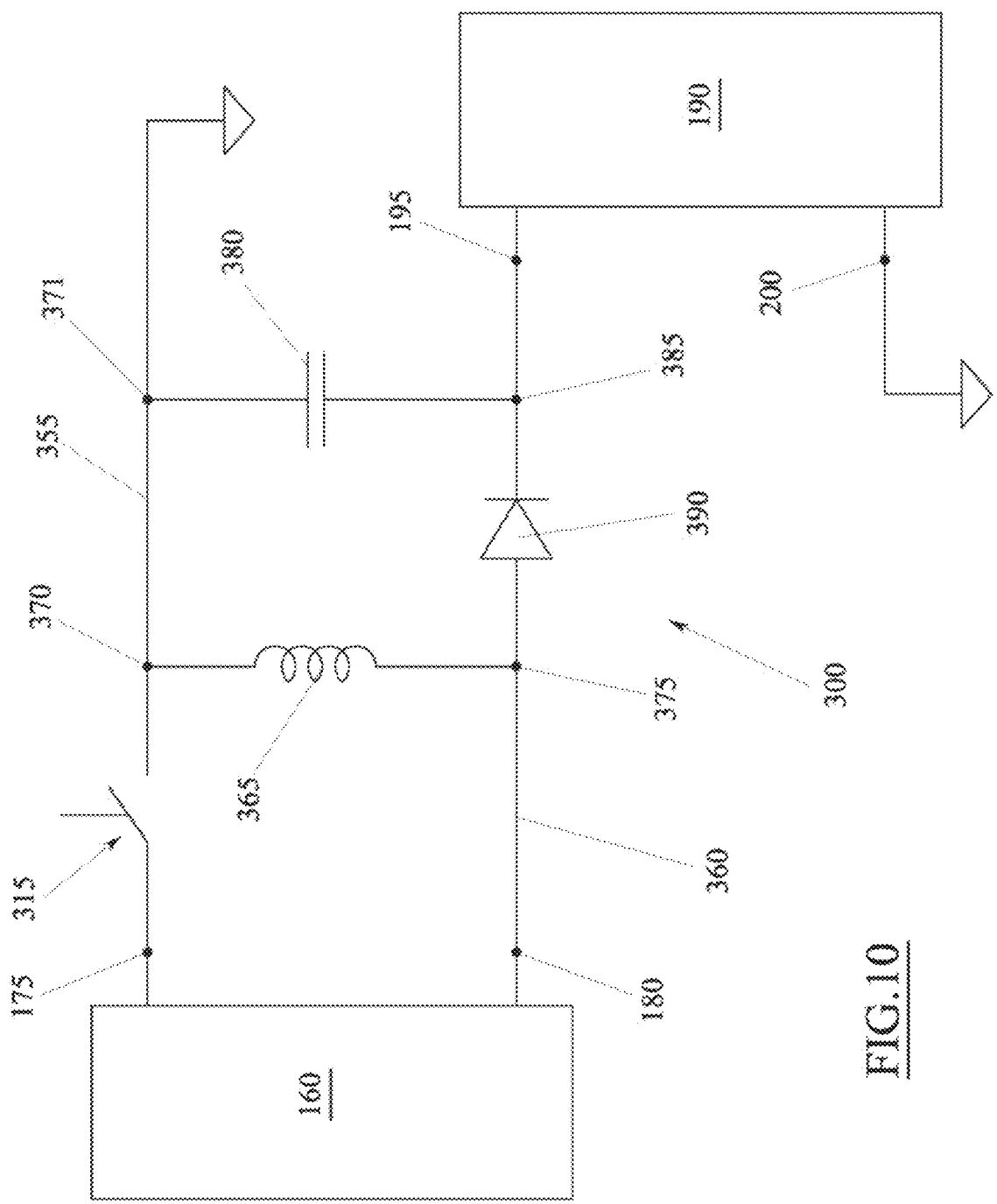
FIG. 10 is the scheme of a fourth embodiment of a converter belonging to the converter of FIG. 1.

On the other hand, if the power transmitted to the electrical load 110 becomes high and the power factor must be particularly high, as occurs for example in server or data-center feeding systems, or other high-power applications, it may be useful to make a converter 300 in the form of a buck boost converter, an example of which is illustrated in detail in FIG. 10.

In practice, the converter 300 according to this embodiment can comprise a first electrical branch 355 adapted for connecting the first output terminal 175 of the rectifier 160 to the second input terminal 200 of the wave generator 190, for example connecting them both to the same reference potential as illustrated in the figures, a second electrical branch 360 adapted for connecting the second output terminal 180 of the rectifier 160 to the first input terminal 195 of the wave generator 190, and an inductance 365 having a first terminal connected to a first intermediate node 370 of the first electrical branch 355, i.e. arranged between the first output terminal 175 of the rectifier 160 and the second input terminal 200 of the wave generator 190 (or reference potential), and a second terminal connected to a first intermediate node 375 of the second electrical branch 360, i.e. arranged between the second output terminal 180 of the rectifier 160 and the first input terminal 195 of the wave generator 190.

The converter 300 also comprises an active switch 315, which can be arranged on the first electrical branch 355 between the first output terminal 175 of the rectifier 160 and the first intermediate node 370 (as illustrated in the figures), or on the second electrical branch 360 between the second output terminal 180 of the rectifier 160 and the first electrical node 375 of the second electrical branch 360.

The converter 300 can also comprise a capacity 380 having a first terminal connected to a second intermediate node 371 of the first electrical branch 355, arranged between the first intermediate node 370 and the second input terminal 200 of the wave generator 190, and a second terminal connected to a second intermediate node 385 of the second electrical branch 360, arranged between the first intermediate node 375 and the first input terminal 195 of the wave generator 190.

If the active switch 315 is an MOS of type N, in the case in which it is arranged on the first electrical branch 355, then the drain terminal of the MOS will be connected to the first intermediate node 370 and the source terminal will be connected to the first output terminal 175 of the rectifier 160.

Finally, the converter 300 can comprise a flyback diode 390 arranged on the second electrical branch 360 and having anode connected to the first intermediate node 375 and cathode connected to the second intermediate node 385, so as to prevent the current from being able to flow in the inductance 365 sliding from the first intermediate node 370 of the first electrical branch 355 towards the first intermediate node 375 of the second electrical branch 360.

It should be observed that, in the illustrated embodiment, the first intermediate node 370 and the second intermediate node 371 of the first electrical branch 355 are directly connected by a simple conductive segment, for which reason they substantially define a single electrical node.

In other embodiments, the flyback diode 390 could however be positioned on the first electrical branch 355 with anode connected to the second intermediate node 371 and cathode connected to the first intermediate node 370.

The converter 300 according to this buck-boost scheme has an inverting effect with respect to the feed voltage coming from the rectifier 160, which is delivered to the converter 300 inverted, therefore so as to feed it with negative voltage. Therefore, the proposed buck-boost converter 300, being inverting and fed with negative voltage, supplies the wave generator 190 with a positive voltage.

With respect to the converters described earlier, the buck-boost converter 300 has the advantage of being able to continue to operate correctly also during the time period in which the rectified sinusoid coming from the rectifier 160 falls to voltage values that are below the minimum operating voltage necessary for the wave generator 190 and improving the power factor of the proposed apparatus 100.

This makes it possible to ensure the transfer of power to the electrical load 110 for a greater amount of time than the network period, thus being able to further reduce or even eliminate the filtering capacity 185, but without having to have too many compromises in terms of power transfer to the load.

Although the buck-boost converter 300 of the inverting type outlined earlier can be particularly advantageous, this does not rule out the possibility that, in other embodiments, it can be replaced by other Buck-Boost converters according to classic schemes, not necessarily inverting.

For example, the converter 300 could be made in the form of a synchronous double diode Buck-Boost.

In other embodiments, the converter 300 could be made from any PFC (Power Factor Correction) circuit or BPFC (Bridgeless Power Factor Correction) circuit, for example of the buck, boost, buck-boost type and possibly operating in a resonant manner.

Among these circuits, merely as a non-limiting example, are those described in American patents U.S. Pat. No. 4,412,277, US20070279955A1 and US20100259240A1.

The converters 300 according to all of the embodiments described earlier achieve not only the advantage of lowering the voltage withstood by the active switches 250 of the wave generator 190, but also the advantage of increasing the number of degrees of freedom present in the system, always ensuring the tuning of the switching circuits 245 and ensuring the possibility of effectively, and more simply, adjusting the voltage applied to the electrical load 110, regardless of the power absorbed by the electrical load 110 itself.

Another advantage of the converters 300 described above is that of reducing the filtering capacity 185 in output from the rectifier 160 to very low values and possibly eliminating it, drastically reducing the bulk and the total costs of the converter 100.

By virtue of the reduction or elimination of the filtering capacity 185, the converters 300 described above finally achieve the advantage of substantially improving the power factor of the converter 100.

In conclusion, it should finally be observed that, according to a possible embodiment of the invention, every version of the apparatus 100 described earlier can be made as a feeding device (understood as unitary component), which can be connected through electric cables to the electrical load 105.

In this case, all of the essential components of the apparatus 100, including in particular the primary circuit 115 with the converter 300, the secondary circuit 120, the coupling device 125 and possibly the rectifier 160 if present, can be integrated in a single "indivisible object" that, on one side, can be connected with the source of alternating voltage 106 or with the source of direct voltage, and on the opposite side with the load 110.

In this context, the coupling device 125 that electrically couples the primary circuit 115 with the secondary circuit 120 can be made from inseparable components that, in the example case of a capacitive coupling, can comprise one, two or more discreet capacities, i.e. made as a pre-assembled component that is installed as an ensemble in said "indivisible object".

Alternatively, a different embodiment of the invention provides that any version of the apparatus 100 described earlier can be made as a wireless power transmission system between two distinct devices, without galvanic connection between them, as described in American application U.S. Pat. No. 9,209,674 to the same Applicant.

In practice, said wireless transmission system could comprise a feeding device and a user device, separate and independent from the feeding device, i.e. which does not have any type of physical/mechanical connection with the feeding device and that can be moved with respect to the latter.

The user device can be any electric/electronic device, like for example a mobile telephone, a computer, tablet or other, equipped with its own outer body or carcass independent from the outer body or carcass of the feeding device.

The feeding device can comprise the components of the apparatus 100 that define the primary circuit 115 and possibly the rectifier 160 whereas the user device can comprise the components of the apparatus 100 that define the secondary circuit 120 and possibly the electrical load 110, which can be represented by the internal batteries to be recharged and/or the electronic apparatuses to be fed to allow the operation of the user device.

In this context, the coupling device 125 between the primary circuit 115 and the secondary circuit 120 must ensure a total insulation and must be made from separable components.

For example, in the case of inductive coupling, the coupling device can comprise at least one transmission coil installed on the feeding device and at least one receiving coil installed on the user device, which are capable of inductively coupling with each other for one or more specific relative positions of the user device with respect to the feeding device.

In the case of capacitive coupling, the coupling device can comprise at least two receiving plates installed in the user device and at least two transmitting plates installed in the feeding device.

These plates must be arranged in the respective devices so that, by bringing the user device towards the feeding device, for example resting the first on the second, each receiving plate faces a corresponding transmitting plate, globally making the two insulation capacities 150 and 155.

The feeding device could also comprise multiple transmission plates, suitably arranged, so that the receiving plates of the user device can face at least two transmitting plates, for multiple positons of the user device with respect to the feeding device, and/or so that the feeding device can couple with many user devices simultaneously. In conclusion, it should be observed that, although in the above description reference has always been made to "voltage waves", in terms of terminology the wave generator 190 could be considered as a generator of "electrical current waves", without this changing anything of what is described, since "electrical current waves" always correspond to "voltage waves".

Of course, those skilled in the art can bring numerous technical application modifications to the converter 100 as described above, without for this reason departing from the invention as claimed below.

The invention claimed is:

1. An apparatus for transferring electrical power to an electrical load, comprising:
   a primary circuit,
   an electrical source adapted for supplying said primary circuit with a direct input voltage, wherein the electrical source comprises a first output terminal and a second output terminal and is configured to apply a direct voltage difference between the first output terminal and the second output terminal, a value of an electrical voltage applied to the first output terminal being not less than the electrical voltage value applied to the second output terminal,
   a secondary circuit adapted for feeding the electrical load, and
   a coupling device adapted for transferring electrical power from the primary circuit to the secondary circuit,
   wherein the primary circuit comprises:
   a converter adapted for receiving the direct input voltage, for modifying said direct input voltage to obtain a modified voltage, and for outputting said modified voltage, and a wave generator comprising at least one switching circuit, which is adapted for receiving in input the modified voltage from the converter, for converting said modified voltage into voltage waves and for applying said voltage waves to said coupling device,
   wherein the switching circuit comprises:
   an active switch having a first connection terminal, a second connecting terminal and a control terminal,
   a choke inductance having a terminal connected with a first input terminal of the wave generator and an opposite terminal connected to the first connection terminal of the active switch,
   the second connection terminal of the active switch being connected to a second input terminal of the wave generator,
   wherein the converter comprises:
   a first electrical branch adapted for connecting the first output terminal of the electrical source to the second input terminal of the wave generator,
   a second electrical branch adapted for connecting the second output terminal of the electrical source to the first input terminal of the wave generator,
   an inductance having a first terminal connected to a first intermediate node of the first electrical branch and a second terminal connected to a first intermediate node of the second electrical branch,
   a capacity having a first terminal connected to a second intermediate node of the first electrical branch, arranged between the first intermediate node of the first electrical branch and the second input terminal of the wave generator, and a second terminal connected to a second intermediate node of the second electrical branch, arranged between the first intermediate node and the first input terminal of the wave generator,
   a flyback diode adapted for preventing the electrical current from being able to slide through the inductance from the first intermediate node of the second electrical branch towards the first intermediate node of the first electrical branch, and
   at least one active switch adapted for selectively allowing or preventing the passage of electrical current from the electrical source to the wave generator wherein said active switch is arranged on the first electrical branch between the first output terminal of the electrical source and the first intermediate node of the first electrical branch or on the second electrical branch between the second output terminal of the electrical source and the first intermediate node of the second electrical branch.

2. An apparatus according to claim 1, wherein the electrical source comprises a rectifier adapted for receiving an alternating voltage in input, for converting said alternating voltage into the direct input voltage and for supplying the primary circuit with said direct input voltage.

3. An apparatus according to claim 1, wherein the active switch of the converter is controlled with an electric control signal having lower frequency with respect to the frequency of the electric control signal that controls the active switch of the wave generator.

4. An apparatus according to claim 1, wherein the coupling device comprises at least one insulation capacity.

5. An apparatus according to claim 4, wherein the coupling device comprises at least two insulation capacities.

6. An apparatus according to claim 1, wherein the switching circuit of the wave generator is a resonant switching circuit.

7. An apparatus according to claim 6, wherein the switching circuit is a resonant switching circuit operating in zero-voltage-switching or zero-current-switching mode.

8. An apparatus according to claim 1, wherein a central node between said choke inductance and said active switch being connected to the coupling device.

9. An apparatus the claim 8, wherein the switching circuit comprises a tank capacity having a first terminal connected to the central node and a second terminal connected to the second connecting terminal of the active switch.

10. An apparatus according to claim 8, wherein the switching circuit comprises a resonance inductance having a first terminal connected to the central node and a second terminal connected to the coupling device.

11. An apparatus according to claim 1, wherein the wave generator comprises a single switching circuit connected to the coupling device according to a Single-Ended scheme.

12. An apparatus according to claim 1, wherein the wave generator comprises at least two switching circuits connected to the coupling device in Push-Pull mode.

13. An apparatus according to claim 1, wherein the secondary circuit can comprise a rectifier adapted for receiving the voltage waves transmitted by the coupling device, for converting said voltage waves into a direct voltage and for supplying said direct voltage to the electrical load.

14. An apparatus according claim 1, comprising a feeding device and a user device, said user device being separate, independent and mobile with respect to the feeding device, wherein the primary circuit is installed in the feeding device and the secondary circuit is installed in the user device.

* * * * *